United States Patent Office 3,652,740

Patented Mar. 28, 1972

1

3,652,740

O-ALKYL-O-PHENYL-THIOLPHOSPHORIC ACID ESTERS

Gerhard Schrader, Wuppertal-Cronenberg, Ingeborg Hammann, Cologne, Wilhelm Stendel, Wuppertal-Vohwinkel, and Gunter Unterstenhofer and Bernhard Homeyer, Opladen, Germany, assignors to Farbenfabriken Bayer Aktiengesellschaft, Leverkusen, Germany No Drawing. Filed Aug. 1, 1969, Ser. No. 846,938
Claims priority, application Germany, Aug. 13, 1968, P 17 93 188.3
Int. Cl. A01n *9/36*; C07f *9/12, 9/14*
U.S. Cl. 260—949 6 Claims

ABSTRACT OF THE DISCLOSURE

O-alkyl-O-phenyl-thiolphosphoric acid esters, i.e. O-alkyl - O - (3-methyl-4-methylmercapto-phenyl)-S-(alkylmercapto-methyl and $\beta$ - alkylmercapto-ethyl)thiolphosphoric acid esters, which possess arthropodicidal, especially acaricidal and insecticidal, and nematocidal properties and which may be produced by conventional methods.

The present invention relates to and has for its objects the provision for particular new O-alkyl-O-phenyl-thiolphosphoric acid esters, i.e. O-alkyl-O-(3-methyl-4-methylmercapto-phenyl)-S-(alkylmercaptomethyl and $\beta$-alkylmercapto-ethyl)thiolphosphoric acid esters, which possess arthropodicidal, especially insecticidal and acaricidal, and nematocidal properties, active compositions in the form of mixtures of such compounds with solid and liquid dispersible carrier vehicles, and methods for producing such compounds and for using such compounds in a new way especially for combating pests, e.g. arthropods and nematodes, with other and further objects becoming apparent from a study of the within specification and accompanying examples.

From German Pats. 949,231 and 1,018,053, and U.S. Pat. 3,156,718, there are known, among other things, (optionally chlorinated) S-benzyl esters of O,O-dialkyl-thiolphosphoric acids. According to the particulars given in said German and U.S. patents, these compounds are distinguished by good insecticidal and acaricidal effectiveness, with simultaneous low toxicity towards warm-blooded animals. Such known compounds are therefore usable as pesticides in crop protection endeavors and in the hygiene field.

Furthermore, in German published patent DAS 1,252,-961, fungicidal mixtures for use in agriculture are described which contain, as active component, symmetrical O,O-dialkyl-S-($\omega$-phenylalkyl)thiolphosphoric acid esters having 2 to 10 carbon atoms in the S- alkyl radical.

In particular, O,O-dimethyl-S-($\beta$-ethylmercaptoethyl)-thiolphosphoric acid ester (A) as well as O,O-diethyl-O-(2,4-dichloro-phenyl)-thionophosphoric acid ester (B)—cf. U.S. Pat. 2,761,806, are known pesticidal, i.e. arthropodicidal and nematocidal, compounds.

It has now been found, in accordance with the present invention, that the particular new O-alkyl-O-phenyl-thiolphosphoric acid esters of the formula

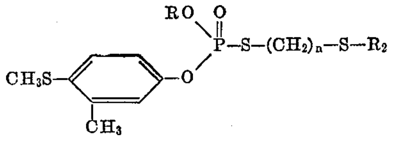

(I)

in which

R is alkyl of 1–4 carbon atoms,
$R_2$ is alkyl of 1–4 carbon atoms, and
$n$ is a whole number from 1 to 2,

2 exhibit strong arthropodicidal, especially insecticidal and acaricidal, and nematocidal properties.

It has been furthemore found, in accordance with the present invention, that the compounds of Formula I above may be produced by the process which comprises hydrolyzing an O-alkyl-O-phenyl-thionophosphoric acid ester halide of the formula

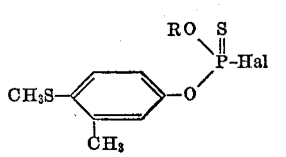

(II)

in which

R is as defined above, and
Hal is a halogen atom such as chloro, bromo, iodo and fluoro, especially chloro and bromo, with an alkali hydroxide of the formula $$MOH \quad (III)$$

in which

M is monovalent metal equivalent or the ammonium group, especially sodium, potassium or ammonium, and reacting the hydrolysis product formed, expediently without previous isolation, with an alkylmercaptoalkyl halide of the formula $$Hal—(CH_2)_n—S—R_2 \quad (IV)$$

in which $R_2$, $n$ and Hal are the same as defined above.

Surprisingly, the active compounds of Formula I above according to the present invention, compared to active compounds of analogous constitution and the same type of activity hitherto known from the literature, are distinguished by a substantially better effectiveness, in particular outstanding insecticidal, acaricidal and nematocidal properties, and especially noteworthy activity against eating as well as sucking insects and excellent effectiveness against spider mites and ticks, with considerably lower toxicity to warm-blooded animals. Therefore, the instant compounds represent a valuable contribution to the art.

The course of the production reaction can be represented by the following formula scheme:

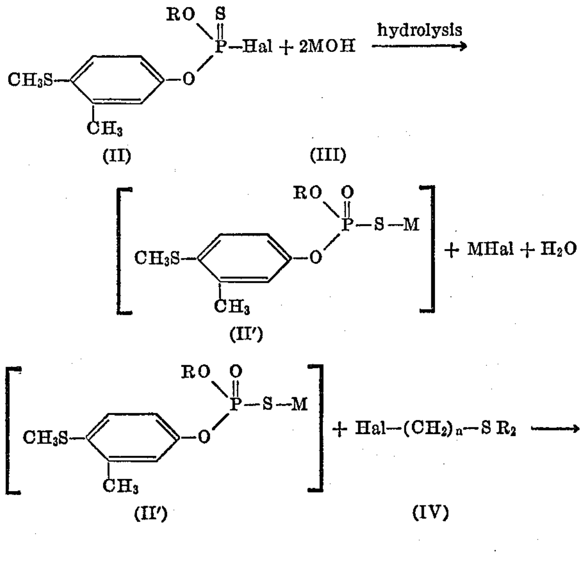

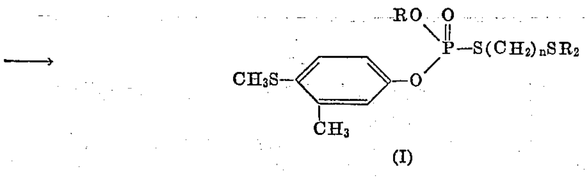

(I)

In the foregoing equation, R, $R_2$, Hal, M and *n* are the same as defined above.

Advantageously, in accordance with the present invention, in the various formulae herein:

R represents
straight and branched chain lower alkyl hydrocarbon of 1–4 carbon atoms such as methyl, ethyl, n- and isopropyl, n-, iso-, sec.- and tert.-butyl, and the like, especially $C_{1-3}$ or $C_{1-2}$ alkyl;

$R_2$ represents
straight and branched chain alkyl hydrocarbon of 1–4 carbon atoms such as methyl to tert.-butyl inclusive as defined above, and the like, especially $C_{1-3}$ or $C_{1-2}$ or $C_{2-4}$ or $C_{2-3}$ alkyl, and more especially ethyl; and

*n* represents
a whole number from 1 to 2, i.e. 1 or 2.

Preferably, R is $C_{1-3}$ or $C_{1-2}$ alkyl; $R_2$ is $C_{1-2}$ or $C_{2-3}$ alkyl, and *n* is 1–2.

In particular, R is $C_{1-2}$ alkyl, $R_2$ is ethyl, and *n* is 1–2.

The O-alkyl-O-phenyl-thionophosphoric acid ester halides of Formula II above required as starting materials for the production reaction are, in part, described in the literature. Such starting compounds can be prepared, even on an industrial scale, according to known methods by reaction of the appropriate O-alkylthionophosphoric acid mono-ester dihalides with the appropriate 4-methylmercapto-phenols in the presence of acid-binding agents. The reaction takes place preferably in aqueous-alkaline solution at room temperature or slightly elevated temperature (see, for example, U.S. Pat. 3,163,688).

As suitable starting materials, the following O-alkyl-O-phenyl-thionophosphoric acid ester halides of Formula II above are mentioned by way of example:

O-ethyl - O - (3-methyl-4-methylmercapto-phenyl)thionophosphoric acid ester chlorides and bromides, as well as the corresponding O-methyl, O-n-propyl and O-isopropyl compounds, and the like.

Of course, the alkali hydroxides of Formula III above usable as hydrolyzing agents for the starting compounds of Formula II above are well known.

As such hydrolyzing agents, chiefly suitable are alkalis, preferably aqueous or aqueous-alcoholic solutions of sodium hydroxide or potassium hydroxide, but corresponding ammonium hydroxide solutions may also be used.

The alkylmercapto-alkyl halides of Formula IV above which serve as the second main reaction component are also known from the literature.

As examples of such starting materials of Formula IV above which may be reacted according to the instant production process, there are mentioned in particular:

β-methylmercapto-ethyl chloride,
β-ethylmercapto-ethyl chloride,
β-isopropylmercapto-ethyl chloride,
methylmercapto-methyl chloride, and
ethylmercapto-methyl chloride, as well as the corresponding bromides, and the like.

Whereas the hydrolysis reaction is expediently caused to proceed in aqueous or aqueous-alcoholic solution, for the ensuing reaction with the alkylmercaptoalkyl halides practically all organic solvents (which term includes mere diluents) or mixtures thereof are suitable. These include aliphatic or aromatic (optionally chlorinated) hydrocarbons such as benzine, methylene chloride, benzene, toluene, chlorobenzene, xylene; ethers, for example diethyl or di-n-butyl ether, dioxan or tetrahydrofuran; and low-boiling aliphatic alcohols, ketones and nitriles, for example methanol, ethanol, isopropanol, butanol, acetone, methylethyl ketone, methylisopropyl ketone, methylisobutyl ketone, acetonitrile and propionitrile, and the like.

The reaction can be carried out within a fairly wide temperature range. In general, the work is carried out at from substantially between about 20–100° C. (or the boiling point of the mixture, whichever is the lower), and preferably at from between about 20–80° C. (or the boiling point of the mixture, whichever is the lower).

As can be seen from the above formula scheme, 2 mols of alkali hydroxide and 1 mol of alkylmercapto-alkyl halide are required per mol of O-alkyl-O-phenyl-thionophosphoric acid ester halide. It has proved expedient to add the solution of alkali hydroxide to the aqueous or aqueous-alcoholic solution of ester halide, to add after completion of the hydrolysis (without isolation of the intermediate product formed) the alkylmercapto-alkyl halide undiluted, or dissolved in one of the aforesaid solvents, to the reaction mixture, with stirring, and subsequently to continue heating the latter to the temperatures stated above for a period of, for example, 1 to 3 hours, in order to complete the reaction. With this method of working, the desired products are obtained with outstanding yields as well as in excellent purity.

The working up of the mixture may take place in customary manner, that is by pouring out the mixture into water, taking up the organic phase in a water-immiscible solvent, separating the phases, washing and drying the organic layer, evaporating the solvent and, if desired, fractionally distilling the residue.

The O-alkyl-O-phenyl-thiophosphoric acid esters according to the present invention are obtained in most cases in the form of colorless to slightly colored water-insoluble oils which cannot be distilled without decomposition, even under greatly reduced pressure. Such compounds can, however, by so-called "slight distillation," that is brief heating in a vacuum to moderately elevated temperatures, be freed from the last volatile components and in this way be purified.

As already mentioned above, the compounds according to the present invention are distinguished by outstanding insecticidal, acaricidal and nematocidal effectiveness. Such compounds further show a distinct complementary fungicidal and bactericidal effect. Additionally, the instant compounds posses only a slight phytotoxicity. The pesticidal effect sets in rapidly and is long-lasting. By reason of these properties, such active compounds are usable in crop protection endeavors and in the protection of stored products, as well as in the hygiene and veterinary fields, for the control of noxious sucking and biting insects, mites, nematodes, fungi and bacteria.

To the sucking insects contemplated herein there belong, in the main, aphids (Aphidae) such as the green peach aphid (*Myzus persicae*), the bean aphid (*Doralis fabae*), the bird cherry aphid (*Rhopalesiphum padi*), the pea aphid (*Macrosiphum pisi*) and the potato aphid (*Macrosiphum solanifolii*), the current gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera) such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera), such as the diamond-back moth (*Plutella maculipennis*), the gipsy moth (*Lymantria dispar*), the brown-tailed moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kühniella*) and greater wax moth (*Galleria mellonella*); and the like. Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*) the drugstore beetle (*Stegobium paniceum*), the yellow mealworm (*Tenebrio molitor*) and the sawtoothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Laucophaea or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitus capitata*), the house fly (*Musca domestica*), the little house fly (*Fannia canicularis*), the black blow fly (*Phormia aegina*) and blue-bottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius=Tetranychus althaeae* or *Tetranychaus urticae*) and the European red mite (*Paratetranychus pilosus=Panonychus ulmi*), blister mites, for example the currant blister mite (*Eriophyes ribis*) and tarsonemids. for example the broad mite (*Hemitarsonemus latus*) and the cyclamen mite (*Tarsonemus pallidus*); finally, ticks, such as the relapsing fever tick (*Ornithodorus moubata*); and the like.

To the phytopathogenic nematodes contemplated herein there belong, in the main, leaf nematodes (Aphelenchoides), such as crysanthemum foliar nematodes (*A. ritzenmabosi*), strawberry nematodes (*A. fragariae*) and rice nematodes (*A. oryzae*); stem nematodes (Ditylenchus), for example the stem nematode (*D. dipsaci*); root gall nematodes (Meloidogyne), such as *M. arenaria* and *M. incognita;* cyst-forming nematodes (Heterodera), such as golden nematode of potato (*H. rostochiensis*), and sugar beet nematode (*H. schachtii*); and free-living root nematodes, for example those of the genera Pratylenchus, Paratylenchus, Rotylenchus, Xiphinema and Radopholus; and the like.

When used against household pests and pests of stored products, particularly flies and mosquitoes, the instant compounds are also distinguished by an outstanding residual activity on wood and clay, and a good stability to alkali on limed substrates.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides and nematocides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2)

a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and nematodes, and more particularly methods of combating at least one of insects, acarids, and nematodes, which comprise applying to at least one of correspondingly (a) such insects, (b) such acarids, (c) such nematodes, and (d) the corresponding habitat thereof, i.e. the locus to be protected, a correspondingly combative or toxic amount, i.e. an arthropodically, especially insecticidally or acaricidally, and/or nematocidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be appreciated by the artisan that when using the instant active compounds against nematodes, such active compounds are preferably uniformly scattered in applied amounts of 5–50 kg. of active compound per hectare and then worked into the soil.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 1:

TABLE 1.—PLUTELLA TEST

| | Active compound (constitution) | Concentration of active compound in percent | Degree of destruction in percent after 3 days |
|---|---|---|---|
| (A) | $(CH_3O)_2\overset{O}{\overset{\parallel}{P}}-S-CH_2-CH_2-SC_2H_5$ (known) | 0.1<br>0.02 | 100<br>0 |
| $(1_1)$ | 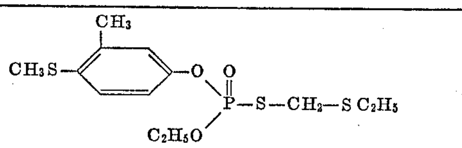 | 0.1<br>0.02<br>0.004 | 100<br>100<br>100 |
| $(2_1)$ | 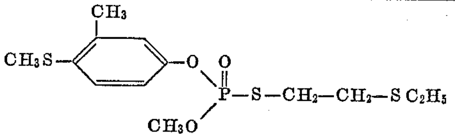 | 0.1<br>0.02 | 100<br>100 |
| $(3_1)$ | 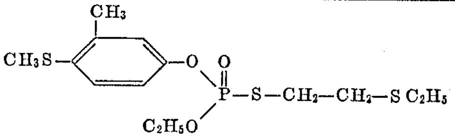 | 0.1<br>0.02<br>0.004 | 100<br>100<br>80 |

EXAMPLE 2

Laphygma test

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent which contains the stated amount of emulsifier, and the resulting concentrate is diluted with water to the desired final concentration.

Cotton leaves (*Gossypium barbadense*) are sprayed with the preparation of the given active compound until dew moist and are then infested with caterpillars of the owlet moth (*Laphygma exigua*).

After the specified period of time, the degree of destruction is determined as a percentage. 100% means that all the caterpillars are killed, whereas 0% means that none of the caterpillars are killed.

The particular active compounds tested, their concentrations, the evaluation time and the results obtained can be seen from the following Table 2:

TABLE 2.—LAPHYGMA TEST

| Active compound (constitution) | | Concentration of active compound in percent | Degree of destruction in percent after 3 days |
|---|---|---|---|
| (A) | $(CH_3O)_2P(=O)-S-CH_2-CH_2-SC_2H_5$ (known) | 0.1<br>0.02 | 100<br>0 |
| $(1_2)$ | 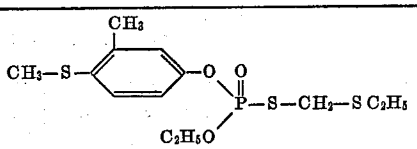 | 0.1<br>0.02<br>0.004 | 100<br>100<br>60 |
| $(3_2)$ | 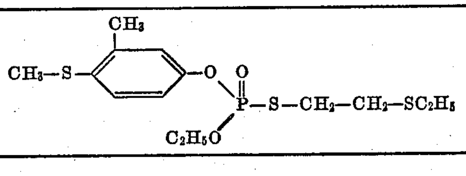 | 0.1<br>0.02 | 100<br>80 |

EXAMPLE 3

Test with parasitic fly larvae

Solvent:
- 35 parts by weight ethylpolyglycol monomethyl ether.
- 35 parts by weight nonylphenol polyglycol ether.

To produce a suitable preparation of the particular active compound, 30 parts by weight of such active compound are mixed with the stated amount of solvent which contains the stated amount of emulsifier, and the resulting concentrate is diluted with water to the desired final concentration.

About 20 fly larvae (*Chrysomyia chloropyga*) are placed in a test tube which contains about 1 (one) cc. of horse muscle. 0.5 ml. of the preparation of the given active compound is placed on this horseflesh. After 24 hours, the degree of destruction is determined as a percentage. 100% means that all, and 0% means that none, of the larvae are killed.

The particular active compounds tested, their concentrations, and the test results obtained can be seen from the following Table 3:

TABLE 3.—TEST WITH PARASITIC FLY LARVAE

| Active compound (constitution) | | Concentration of active compound in percent | Degree of destruction in percent after 24 hours |
|---|---|---|---|
| $(2_2)$ | 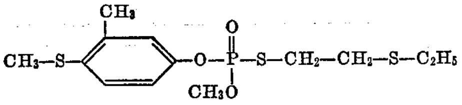 | 0.03<br>0.003<br>0.0003 | 100<br>100<br>>50 |
| $(1_3)$ | 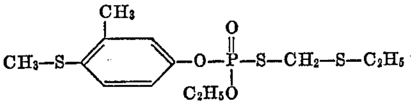 | 0.03<br>0.003<br>0.0003 | 100<br>100<br>100 |

EXAMPLE 4

Critical concentration test

Test nematode: *Meloidogyne incognito*
Solvent: 40 parts by weight dimethyl formamide
Emulsifier: 10 parts by weight alkylaryl polyglycol ether.

To produce a suitable preparation of the particular active compound, 1 part by weight of such active compound is mixed with the stated amount of solvent, the stated amount of emulsifier is added thereto, and the resulting concentrate is diluted with water to the desired final concentration.

The preparation of the given active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C.

After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The particular active compounds tested, the amounts applied and the results obtained can be seen from the following Table 4:

TABLE 4.—CRITICAL CONCENTRATION TEST

| | Active compound (constitution) | Degree of effectiveness as a percentage with applied amounts of (p.p.m.)— 40 | 20 | 10 | 5 |
|---|---|---|---|---|---|
| (B) | 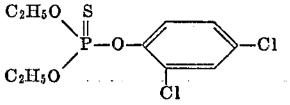 (known) | 98 | 80 | 50 | 0 |
| ($1_1$) | 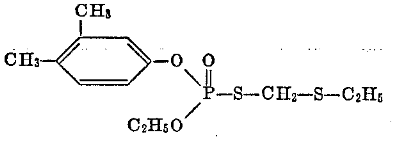 | 100 | 100 | 80 | 50 |

EXAMPLE 5

($3_3$)

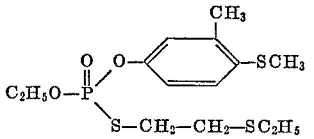

125 g. O-ethyl-O-(3-methyl-4-methylmercapto-phenyl)-thionophosphoric acid ester chloride are dissolved in 200 ml. ethanol. 50 ml. of water are added to this solution. There are then added to it dropwise, with stirring, 48 g. potassium hydroxide dissolved in 100 ml. of water. The reaction mixture is further stirred for 1 hour at 50 to 60° C., and 50 g. β-ethylmercapto-ethyl chloride are then added dropwise to the mixture. The latter is subsequently heated for 2 hours to 70° C. Finally, the reaction mixture is poured into 400 ml. of ice water, the organic layer is taken up with benzene, and the benzene solution is separated, washed with water until it reacts in a neutral manner, and dried over sodium sulfate. After the solvent has been distilled off, 123 g. (84% of the theory) of O-ethyl-O-(3-methyl - 4 - methylmercapto - phenyl)-S-(β-ethylmercapto-ethyl)-thiolphosphoric acid ester are obtained as a water-insoluble yellow oil.

In a manner analogous with that described above, but using ethylmercapto - methyl chloride, the compound O-ethyl-O-(3-methyl-4-methylmercapto-phenyl) - S - (ethylmercapto-methyl)-thiolphosphoric acid ester, of the following constitution ($1_6$)

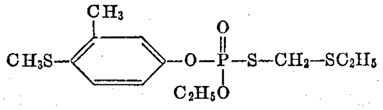

is obtained with a yield of 87% of the theory.

Calculated for $C_{13}H_{21}O_3PS_3$ (percent): (molecular weight 352). S, 27.3; P, 8.8. Found (percent): S, 27.1; P, 9.07.

EXAMPLE 6

($2_3$)

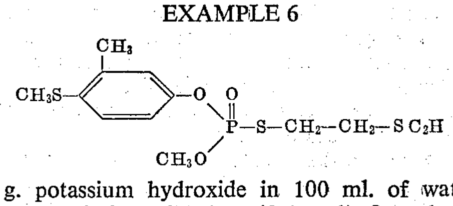

48 g. potassium hydroxide in 100 ml. of water are added to a solution of 118 g. (0.4 mol) O-methyl-O-(3-methyl-4-methylmercapto-phenyl)-thionophosphoric acid ester chloride (prepared according to the particulars given in U.S. Pat. 3,163,668) in 200 cc. ethanol and 50 hour until neutral reaction has occurred. 50 g. β-ethylmercapto-ethyl chloride are then added to the reaction mixture, and the latter is stirred for a further 2 hours at ml. of water. The mixture is subsequently stirred for one 70° C. The mixture is then poured into water, and the separated oil is taken up with benzene. The resulting benzene solution is washed neutral and then dried, the solvent is evaporated, and the residue is slightly distilled. 86 g. (61% of the theory) of O-methyl-O-(3-methyl-4-methylmercapto-phenyl) - S - (β - ethylmercapto-ethyl)-thiolphosphoric acid ester are obtained in the form of a water-insoluble, non-distillable oil.

Calculated for $C_{13}H_{21}O_3PS_3$ (percent): (molecular weight 352). S, 27.27; P, 8.8. Found (percent): S, 27.4; P, 8.4.

It will be realized that all of the foregoing compounds contemplated by the present invention possess the desired selective pesticidal, especially arthropodicidal, i.e. insecticidal or acaricidal, and nematocidal, properties for combating insects and acarids, as well as nematodes, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. O-alkyl-O-phenyl-thiolphosphoric acid ester of the formula

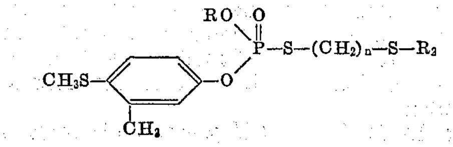

in which R is alkyl of 1–4 carbon atoms, $R_2$ is alkyl of 1–4 carbon atoms, and $n$ is a whole number from 1 to 2.

2. Compound according to claim 1 wherein R is $C_{1-3}$ alkyl, and $R_2$ is $C_{1-2}$ alkyl.

3. Compound according to claim 1 wherein R is $C_{1-2}$ alkyl, and $R_2$ is ethyl.

4. Compound according to claim 1 of the formula
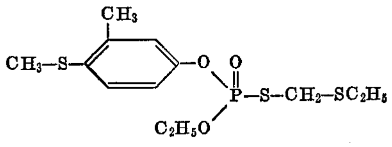
5. Compound according to claim 1 of the formula
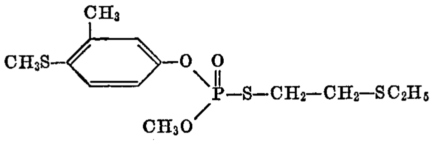
6. Compound according to claim 1 of the formula
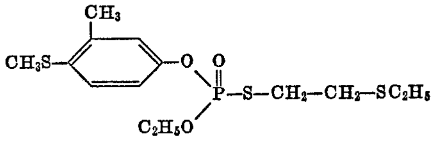
References Cited
UNITED STATES PATENTS
| | | | |
|---|---|---|---|
| 3,294,874 | 12/1966 | Schrader | 260—949 X |
| 3,336,420 | 8/1967 | Cölln et al. | 260—949 X |
JOSEPH REBOLD, Primary Examiner
R. L. RAYMOND, Assistant Examiner
U.S. Cl. X.R.
260—979, 987; 424—216

PO-1050
(5/69)

UNITED STATES PATENT OFFICE
CERTIFICATE OF CORRECTION

Patent No. 3,652,740 Dated March 28, 1972

Inventor(s) Gerhard Schrader, et al.

It is certified that error appears in the above-identified patent and that said Letters Patent are hereby corrected as shown below:

Col. 11, line 68

1st formula: "$SC_2H$" should be --$SC_2H_5$--

Col. 12, line 4

After line 4, insert --hour until neutral reaction has occurred. 50 g ß-ethyl-mercapto-ethyl chloride are then added to the reaction mixture, and the latter is stirred for a further 2 hours at--

Col. 12, line 34

"27.27" should be --27.2%--

Column 12, lines 1 to 3, cancel "hour until neutral reaction has occurred. 50 g. ß-ethyl-mercapto-ethyl chloride are then added to the reaction mixture, and the latter is stirred for a further 2 hours at"

Signed and sealed this 18th day of July 1972.

(SEAL)
Attest:

EDWARD M.FLETCHER,JR.
Attesting Officer

ROBERT GOTTSCHALK
Commissioner of Patents